F. C. HEBERHART.
Meat Chopper.
No. 36,518.  Patented Sept. 23, 1862.
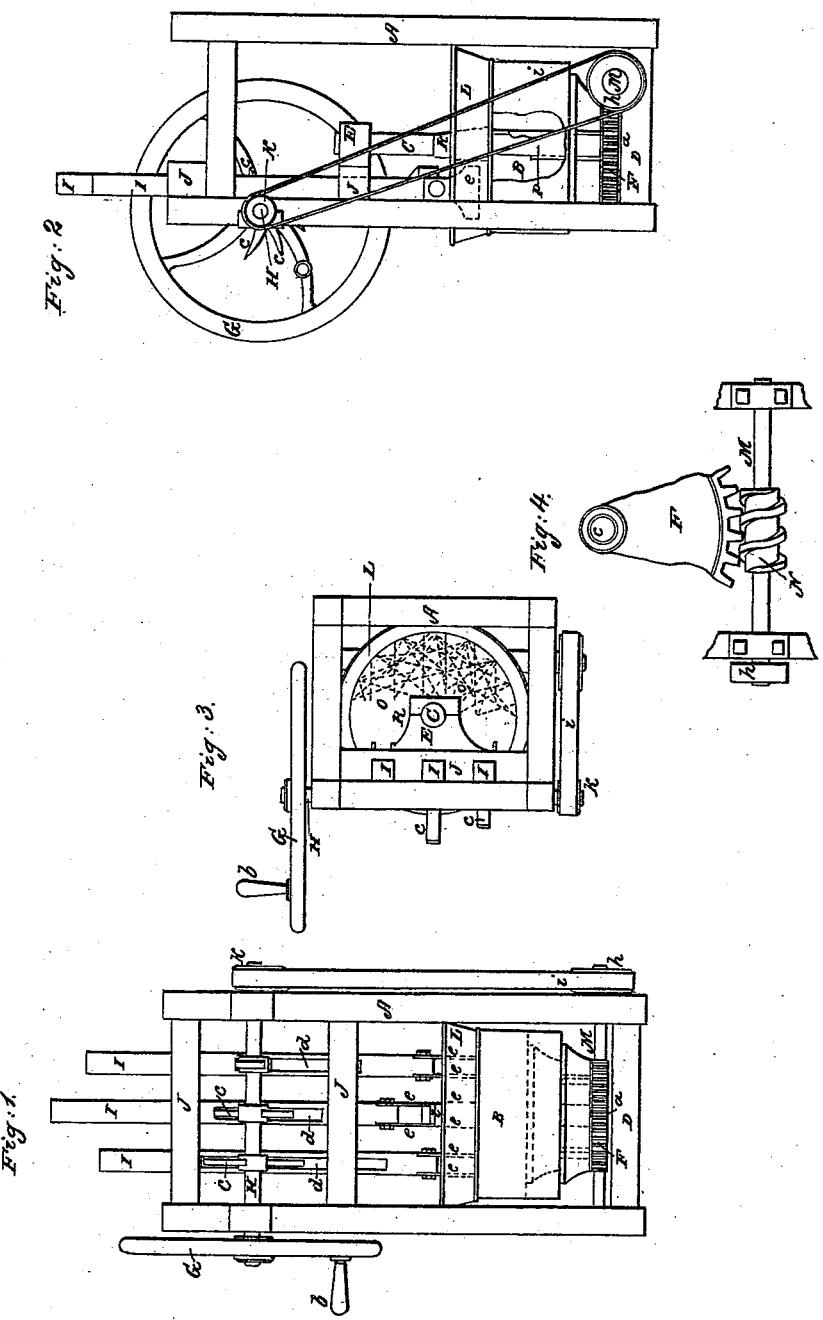

UNITED STATES PATENT OFFICE.

F. C. HEBERHART, OF MADISON, INDIANA.

IMPROVED MEAT-CHOPPER.

Specification forming part of Letters Patent No. 36,518, dated September 23, 1862.

*To all whom it may concern:*

Be it known that I, F. C. HEBERHART, of Madison, in the county of Jefferson and State of Indiana, have invented a new and useful Improvement in Machines for Chopping Meat; and I do hereby declare the following to be a full, clear, and exact description thereof, reference being had to the accompanying drawings and letters of reference marked thereon, making part of this specification.

My invention relates to that class of machines for chopping meat in which the knives are elevated by mechanism and allowed to fall by their own weight or by the aid of springs upon a revolving circular block. The meat being carried by the block is thereby presented to the action of the knives, and is cut by them in their descent; and my improvement consists in the combination and arrangement of the various parts, as hereinafter described, by which the machine is rendered more substantial, convenient, and perfect in its operation.

I will in the first place remark that machines of the class to which mine belongs, as ordinarily constructed and arranged, have been found defective in their operation from one or more of the following causes: In some of them the means of elevating the block from time to time as it wears away and supporting it at a proper height have not been appropriate. In others the arrangement of the hoop around the block, so as to accommodate the expansion and contraction of the latter without permitting an opening through which the chopped meat could escape, has not been perfect. In others the means of rotating the block have not been substantial and complete, and in others the arrangement of the knives has not been such as to cause them to operate uniformly upon all the meat on the block, some portion of the meat being chopped very fine and other portions passed over only partially cut.

I do not desire to be understood as representing that all the foregoing imperfections pertain to any one machine, but that they are common, and that one or more of them are found in all the machines of this class with which I am acquainted.

I will now describe my invention in detail and show how the foregoing objections have been obviated.

In the annexed drawings, Figure 1 is a front elevation of the machine. Fig. 2 is a side elevation. Fig. 3 is a top view. Fig. 4 is an enlarged representation of a portion of the gear-wheel and the helical wheel by which motion is communicated to the block, as will hereinafter appear.

Like letters of reference indicate like parts in all the drawings.

A is the frame of the machine, consisting of four upright corner-posts connected by cross-timbers at top and bottom, as shown, forming an upright rectangular frame.

B is a circular block of wood supported upon a stout shaft, C, which passes through it centrally, and has a step in cross-piece D, its upper end being supported in the box E, as shown in Fig. 3.

F is a gear-wheel carried by shaft C, upon which it is firmly secured. For greater stability the eye of this wheel has a broad face, which rests upon cross-piece D, as shown in Figs. 1 and 2 and indicated by *a*. This broad bearing is necessary to support the weight of the block B and to receive the concussion produced by the falling of the knives upon the face of the block, as will be described hereinafter. As the block B wears away by the action of the knives upon its face, it is free to be elevated upon the shaft to any required height or position, where it may be supported by blocks resting upon wheel F.

G is a crank-wheel operated by the handle *b*. In case it be desired to operate the machine by power, this wheel may be in the form of a pulley to receive a belt. The wheel is firmly secured to and gives motion to the horizontal shaft H, upon which three curved cross arms, *c*, are placed.

I I I are three square vertical knife or bit holders, having slots *d d d*, in which cross-arms *c* work, and by which the knife-holders are alternately raised and allowed to fall when shaft H is rotated, as will be perceived without further explanation.

*e e e*, &c., are knives or bits secured by bolts or screws, two to the lower ends of each of the holders H. The knives fall with their edges upon the surface of block B with the force of the weight of the holders to which they are attached, respectively, or any additional weight or spring that may be applied, and in their course the knives cut or sever the meat which may rest upon the block. The knife-holders I work in guides formed in the cross-pieces J J, as shown.

K is a conical piece surrounding shaft C, with its base resting upon block B. Its office is to prevent the meat on the block from working toward the center and out of the track of the knives.

L is a sheet-metal hoop resting upon the block and inclosing the substance which is being chopped from escaping over the edge of the block. The arrangement of the knives is such that the annular space between hoop L and cone K, which is occupied by the meat or other substance to be cut or chopped, is completely cut through by them in all directions.

M is a horizontal shaft, having a pulley, $h$, which receives a belt, $i$, from pulley $k$ on shaft H, by which the shaft is rotated. N is a small helical or screw-thread wheel on shaft N, which, being in gear with wheel F, communicates a slow motion to block B when the machine is operated.

The central aperture in block B, through which shaft C passes, is bushed or lined with a heavy iron pipe, P, as represented in Fig. 2, where a portion of the block is broken away. This pipe fills the opening in the block snugly, and the shaft C is nicely, though not tightly, fitted to the aperture of pipe. The object of this arrangement is to cause the block to be held steadily by the central shaft, and at the same time prevent the wood of which the block is composed from shrinking around the shaft and becoming tight thereon. The block is by this means not only held steadily by the shaft, but is also free to be raised when required to compensate for wear, or when it is desired to diminish the fall and cutting force of the knives temporarily.

The operation of my invention will be readily understood from the description I have given; but I desire to call attention to the manner in which the cutting is performed, as illustrated by the diagram O on block B, Fig. 3. It will be seen that, the direction of the knives being tangential to a number of different curves in the circular area of block B, they are caused in the revolution of the block to cross-cut in all directions, thus securing the requisite uniformity in the cutting or mincing of the meat on all parts of the block. I am aware that many of the devices herein described have been separately or in less perfect combinations used before, and I wish, therefore, to restrict myself to the particular combination and arrangement herein specified.

What I claim as my invention, and desire to secure by Letters Patent, is the following:

The combination and arrangement of the knives $e$, rotating block B, pipe P, hoop L, cone K, wheel F, and helical wheel N, substantially as described, and for the purpose set forth.

In testimony whereof I have hereunto set my hand.

F. C. HEBERHART.

Witnesses:
 WILLIAM BOWMAN,
 T. POGUE.